United States Patent [19]

Craun et al.

[11] Patent Number: 4,525,535
[45] Date of Patent: Jun. 25, 1985

[54] AQUEOUS GLYCOLURIL THERMOSETTING COATING

[75] Inventors: Gary P. Craun, Wickliffe; Henry J. DeGraaf, Stow, both of Ohio

[73] Assignee: SCM Corporation, New York, N.Y.

[21] Appl. No.: 663,596

[22] Filed: Oct. 22, 1984

[51] Int. Cl.³ .............................................. C08L 61/24
[52] U.S. Cl. .................................... 525/163; 524/512; 524/513; 524/501; 524/598; 524/601; 525/175; 525/443
[58] Field of Search ............... 524/512, 513, 598, 601, 524/501; 525/163, 175, 443

[56] References Cited

U.S. PATENT DOCUMENTS

| | | | |
|---|---|---|---|
| 4,064,191 | 12/1977 | Parekh | 525/375 |
| 4,442,257 | 4/1984 | Borovicka, Sr. et al. | 524/555 |
| 4,487,889 | 12/1984 | Craun | 524/512 |

Primary Examiner—Theodore E. Pertilla
Attorney, Agent, or Firm—Thomas M. Schmitz

[57] ABSTRACT

A protective surface coating composition particularly useful for wood coating containing hydroxylated polyester, glycoluril, and emulsion polymer can be heat cured to produce cured films on substrates. The coating is particularly useful as wood coatings.

6 Claims, No Drawings

AQUEOUS GLYCOLURIL THERMOSETTING COATING

BACKGROUND OF THE INVENTION

This application is related to commonly assigned Ser. No. 603,693 filed Apr. 4, 1984 now being U.S. Pat. No. 4,487,889 issued 10/11/84.

This invention relates to thermosetting emulsion latex mixtures and more particularly to an aqueous polymeric mixture containing hydroxylated polyester, an emulsion polymer, and a glycoluril adapted to be coreactive with the reactive emulsion polymer upon moderate heating. The thermosetting compositions are useful on a variety of substrates, such as wood and metal.

Glycoluril compositions are known for use in solvent based coatings such as disclosed in U.S. Pat. No. 4,064,191. Powder coatings based on glycoluril are disclosed in U.S. Pat. No. 4,118,432, U.S. Pat. No. 4,254,235 and U.S. Pat. No. 4,255,558. Low temperature cure aqueous dispersed coatings are disclosed in U.S. Pat. No. 4,442,257. In Ser. No. 603,693 now being U.S. Pat. No. 4,487,889, disclosed in a thermosetting composition comprising polyol, emulsion polymer, and glycoluril.

It now has been found that aqueous coatings based on glycoluril and emulsion polymers can be substantially improved by the inclusion of a hydroxylated polyester having a hydroxyl functionality of two or more hydroxyl groups per molecule. The inclusion of a hydroxylated polyester can improve stability of the aqueous dispersed glycoluril polymers and reactive emulsion polymers and particularly can provide substantially improved holdout over porous wood substrates, blocking resistance, MEK resistance, and substrate adhesion. Glycolurilformaldehyde coatings can be formulated in accordance with this invention to provide highly crosslinked binders and coatings exhibiting excellent film properties. Emulsion polymers preferably containing reactive acrylamide, hydroxyl, or carboxyl groups can be blended with the hydroxylated polyester and glycolurils such as methylolated glycolurils to produce high quality coatings which advantageously overcome excess formaldehyde emission problems typically associated with conventional phenol-formaldehyde or urea-formaldehyde systems. A further advantage of the inclusion of hydroxylated polyester in the thermosetting glycoluril and emulsion polymer mixtures is that the quantity of glycoluril can be substantially reduced while still maintaining equivalent or improved film properties. Lower raw material costs at lower crosslinker levels can be obtained in coating compositions prepared at higher solids content while substantially improving the stability of the aqueous dispersed polymeric mixture. A further advantage is achieved with respect to coalescent aids, which can impart water sensitivity to the coating, are no longer required. The coating compositions of this invention will cure as thermoset coatings on a substrate at low temperatures of about 40° C. to 120° C. at time intervals between 0.1 to 20 minutes and advantageously in less than three minutes. Coatings can be formulated from these compositions which are clear or pigmented. These and other advantages of the invention will become more apparent by referring to the detailed description and the illustrative examples.

SUMMARY OF THE INVENTION

Briefly, the composition of this invention comprises by weight between about 2% and 50% hydroxylated polyester between 2% and 50% glycoluril, and between 0% and 90% emulsion polymer. The emulsion polymer comprises copolymerized ethylenically unsaturated monomers and preferably contains copolymerized carboxyl, hydroxyl, acrylamide or methacrylamide monomers. The hydroxylated polyester, emulsion polymer, and glycoluril preferably are blended together under moderate heat.

DETAILED DESCRIPTION OF THE INVENTION

The aqueous thermosetting polymeric mixture of this invention comprises hydroxlyated polyesters, emulsion matrix polymer and glycoluril.

Referring first to the hydroxylated polyesters, the hydroxylated polyester polymer preferably is a low molecular weight polymer having a degree of polymerization between about 1 and 10 and having an average hydroxyl functionality of 2 and preferably 3 or more hydroxy groups per polyester molecule. The molecular weight of the hydroxylated polyester as measured by GPC, gel permeation chromatography, preferably is between 200 and 1,000. GPC can be measured according to ASTM D3016-72, ASTM D3536-76, ASTM D3593-80, and/or ASTM D3016-78. The polymer should contain between 2 and 30% by weight hydroxyl groups or have a hydroxyl number between 66 and 990 as determined by ASTM test method E-222.

Hydroxylated polyester can be saturated or unsaturated linear polymers produced by esterification of excess equivalents of diols or polyols with lesser equivalent amounts of dicarboxylic acids. Ordinarily, the hydroxylated polyesters are produced by condensing between 10% and 100% excess molar equivalents of polyol and/or diol with diacids. Unsaturated dicarboxylic acids and/or anhydrides include for instance maleic, fumaric, mesaconic itaconic, citraconic, dimeric methacrylic acid and similar alpha, beta unsaturated dicarboxylic acids. Saturated dicarboxylic acids or anhydrides include for instance adipic, azelaic, succinic, isophthalic, orthophthalic, or phthalic derivatives and similar saturated dicarboxylic acids. Diols or polyols ordinarily include glycols such as ethylene glycol, propylene glycol, diethylene glycol, dipropylene glycol, butanediols, hexanediols, as well as neopentyl glycol, diethylene glycol, and dipropylene glycol. Polyols can be included such as pentaerythetrol, dipentaerythritol, trimethylol propane, trimethylol ethane, and glycerol as well as polyalkylene glycol ethers and hydroxy alkyl ethers.

The hydroxylated polyester can be produced by simply esterifying the polyols and/or diols and dicarboxylic acids at temperatures around 200° C. or higher for time sufficient to react substantially all of the carboxyl groups and produc a polyester resin having an acid no. less than 10. The hydroxylated polyester has a large excess unreacted alcohol groups providing a linear or branched polyester polymer having a hydroxyl no. between 66 and 990. Preferred low molecular weight polyester having a degree of polymerization between 1 and 10 are preferred and most preferred compositions have a degree of polymerization between 1 and 5 and a hydroxyl number of greater than 400.

Referring next to the emulsion matrix polymer, said emulsion polymer contains polymerized ethylenically unsaturated monomers. Preferred emulsion polymer compositions comprise on a weight basis between 0% and 20% carboxylic monomer, 0% and 20% alkylhydroxy monomer, and the balance being other ethylenically unsaturated monomers. The preferred emulsion polymer contains copolymerized functional monomers comprising copolymerized ethylenically unsaturated monomers including at least 2% copolymerized monomers of acrylamide, N-methylol acrylamide, carboxyl monomer, or hydroxyl monomer. The most preferred emulsion matrix polymer can contain by weight between 1% and 10% acrylamide or methacrylamide and between 0.5% to 10% carboxylic acid monomer, and from 0% to 10% alklhydroxy monomer. The remaining monomers can be other ethylenically unsaturated monomer. The acrylamide monomers can be acrylamide, methacrylamide, ethylacrylamide, acrlonitrile, methacrylonitrile, and similar alkyl acrylamide and methacrylamide monomers. N-alkanol amide monomers include for example, N-methylol acrylamide, N-ethanol acrylamide, N-propanol acrylamide, N-methylol methacrylamide, N-ethanol methacrylamide, and similar acrylamides and methacrylamide. Carboxy containing monomers are ethylenically unsaturated monomers containing carboxyl groups such as acrylic, methacrylic, or ethacrylic acid, as well as itaconic, citriconic, fumaric, maleic, mesaconic and aconitric acids. The preferred acids are acrylic and methacrylic acids. Hydroxyl containing monomers are ethylenically unsaturated monomers containing a hydroxyl and can include for example hydroxy alkyl acrylates or methacrylates such as hydroxyethyl, hydroxypropyl, hydroxybutyl, hydroxyhexyl, hydroxyoctyl and similar lower alkyl hydroxy acrylates and methacrylates. Other ethylenically unsaturated monomers other than acrylamide, carboxy, and hydroxyl monomers can include vinyl unsaturated monomers containing vinyl double bond unsaturation including, for example, vinyl esters such as vinyl acetate vinyl proprionate, vinyl butyrates, vinyl benzoate, isopropenyl acetate and like vinyl esters; and vinyl halides such as vinyl chloride. Ethylenically unsaturated monomers other than vinyl unsaturated monomers can include, for example, styrene, methyl styrenes and similar alkyl styrenes, chlorostyrene, vinyl toluene, vinyl napthalene, divinyl benzene, diallyl phthalate and similar diallyl derivatives, butadiene, alkyl esters of acrylic and methacrylic acid and similar ethylenically unsaturated monomers. Acrylic unsaturated monomers include lower alkyl esters of acrylic or methacrylic acid having an alkyl ester portion containing between 1 to 12 carbon atoms as well as aromatic derivatives of acrylic and methacrylic acid, and can include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids. The ethylenically unsaturated monomers can be copolymerized by free radical induced addition polymerization using peroxy or azo catalyst, common redox catalysts, ultraviolet radiation or the like.

The ethylenic monomers can be polymerized in an aqueous medium at a pH preferably between about 1.0 and 6. Generally, the polymerization is conducted at a temperature of about 20°–100° C. in the presence of a free radical generating catalyst. Commonly used free radical initiators include various peroxygen compounds such as the persulfates, benzoyl peroxide, t-butyl hydroperoxide, cumene hydroperoxide, t-butyl diperphthalate, pelargonyl peroxide and 1-hydroxycyclohexyl hydroperoxide; azo compounds such as azodiisobutyronitrile and dimethylazodiisobutyrate; and the like. Particularly preferred as polymerization initiators are the water-soluble peroxygen compounds such as hydrogen peroxide and the sodium, potassium and ammonium persulfates used by themselves or in activated "redox" type systems. Typical "redox" systems include alkali metal persulfates with: A reducing substance such as a polyhydroxy phenol and oxidizable sulfur compound such as sodium sulfite or sodium bisulfite, a reducing sugar, dimethylamine propionitrile, a diazomercapto compound and a ferricyanide compound, and the like. The amount of initiator used will generally be in the range between about 0.1 to 3% by weight based on the monomers and preferably is maintained between 0.15 and 0.8% by weight. Usually, the initiator will all be charged at the outset of the polymerization, however, incremental addition or proportioning of the initiator is often employed.

When an emulsifier is used to prepare the latices of this invention, they are the general types of anionic and non-ionic emulsifiers. Exemplary anionic emulsifiers which may be employed are: alkali metal or ammonium salts of the sulfates of alcohols having from 8 to 18 carbon atoms, such as sodium lauryl sulfate; ethanolamine lauryl sulfate, ethylamide lauryl sulfate; alkali metal and ammonium salts of sulfonated petroleum or paraffin oils; sodium salts of aromatic sulfonic acids, such as dodecane-1-sulfonic acid and octadiene-1-sulfonic acid; aralkylsulfonates such as sodium isopropyl benzene sulfonate, sodium dodecyl benzene sulfonate and sodium isobutyl napththalene sulfonate; alkali metal and ammonium salts of sulfonated dicarboxylic acid esters such as sodium dioctyl sulfosuccinate, disodium N-octadecylsulfosuccinanate; alkali metal or ammonium salts of free acids of complex organic mono- and diphosphate esters and the like. So-called non-ionic emulsifiers such as octyl-or nonylphenyl polyethoxyethanol and the like can be used.

The amount of emulsifier used by may be from about 0.01 to 6% or more by weight of the monomers. All the emulsifier may be added at the beginning of the polymerization or it may be added incrementally or by proportioning throughout the run. Typical polymerizations for the preparation of the self-emulsion latices of this invention are conducted by charging the monomers into the polymerization reactor which contains water and a portion of the emulsifying agent. The reactor and its contents are heated and the initiator added. The preferred emulsion matrix polymer can contain by weight between 1% and 10% acrylamide or methacrylamide, 0.5% to 10% carboxylic acid monomer, and from 0% to 10% alkylhydroxy monomer with the balance being other ethylenically unsaturated monomers.

The emulsion matrix polymer containing reactive hydroxyl, carboxyl, or acrylamide groups is adapted to be cross-linked by reaction with a glycoluril derivative. Glycoluril derivatives are disclosed in U.S. Pat. No. 4,064,191 and are also known as acetylendiureas.

Glycolurils are derived by reacting two moles of urea with one mole of glyoxal to provide a complex ring structure illustrate as follows:

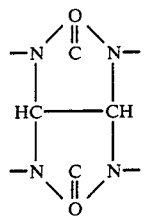

The substitutes constituents can be a hydrogen, or a lower alkyl radical, or can be methylolated partially or fully by reacting with 1 to 4 moles of formaldehyde to provide a methylol glycoluril. The preparation of various glycolurils is illustrated in U.S. Pat. No. 4,064,191 such as tetramethylol glycoluril, tetrabutoxymethyl glycoluril, partially methyolated glycoluril, tetramethoxymethyl glycoluril, and dimethyoxydiethoxy glycoluril. Useful glycoluril derivatives include for example, mono- and dimethylether or dimethylol glycoluril, the trimethylether of tetramethylol glycoluril, the tetramethylether of tetramethylol glycoluril, tetrakisethoxymethyl glycoluril, tetrakisopropoxymethyl glycoluril, tetrakisbutoxymethyl glycoluril, tetrakisamyloxymethyl glycoluril, tetrakishexoxymethyl glycoluril and the like.

A further suitable glycol derivative comprises a dihydroxy ethylene urea which is believed to have the following chemical structure:

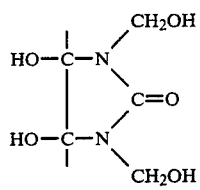

The thermosetting composition of this invention can comprise by weight between 2% and 50% hydroxylated polyester, between 2% and 50% glycoluril, and between 0% and 90% reactive emulsion matrix polymer. Preferred compositions comprise 15% to 40% hydroxylated polyester, 5% to 20% glycoluril, and 30% to 50% reactive emulsion matrix polymer.

The hydroxylated polyester, glycoluril, and emulsion polymer can be blended together at ambient temperatures but preferably are blended under moderate heat above 50° C., preferably between 50° C. and 100° C., and most preferably between 60° C. and 80° C. for time sufficient to obtain a uniform mixture. Typical blend or mixing under heat takes less than two hours. Preferentially improved film properties can be obtained by blending under heat. The polyols can be added directly to the emulsion polymer or to the glycoluril.

Coatings formulations which contain glycoluril crosslinkers can be cured at a substrate temperature of about 130° to 400° F. or higher by an oven bake and/or an infrared bake. Bake schedules can vary, but a film with good physical properties can be prepared on a sealed wood substrate at 130° to 260° F. in less than 5 minutes. Higher acid catalyst levels are generally required at these low bake temperatures. Catalyst additions of 2 to 20% by weight based on total solids comprise a sulfonic acid such as p-toluenesulfonic acid, methane sulfonic acid, or naphthalene sulfonic acid, alone or in combination to produce a sufficient cure. Mineral acids such as $H_2SO_4$, $HCl$, $HNO_3$ and others can be used, but strong organic acids such as the sulfonic acids are preferred. Coatings on metal can be prepared at a higher bake temperature, of about 200° to 400° F. If long bake schedules are used, 5 to 30 minutes, then acid catalyst levels can be reduced to about 0.05 to 2.0%.

The merits of this invention are further illustrated by the following examples.

EXAMPLE 1

(a) Latex. An emulsion polymer was produced from the following components:

| | |
|---|---|
| deionized water | 95 grams |
| sodium dihexyl sulfosuccinate | .27 grams |
| ammonium persulfate | .53 grams |
| sodium bis-tridecyl suffosuccinate | 0.319 grams |
| styrene | 56.2 grams |
| ethyl acrylate | 35.4 grams |
| acrylamide | 4.2 grams |
| glacial methacrylic acid | 4.0 grams |
| sodium formaldehyde sulfoxilate | 0.180 grams |
| tertiary butyl hydroperoxide | 0.012 grams |

The emulsion polymer is prepared as follows. The monomers are polymerized in a conventional reactor using a standard procedure of metering in the main body of monomer into the heated water plus surfactant over a 2-5 hour interval. Batch loading of monomer is possible but not preferred, but a minor portion of the monomer may be added and polymerized before the remaining monomer is pumped in. Changing the monomer composition during the feed is also possible and may lead to faster cure and/or cleaner batches. The reaction is run at 60°-86° C. The sodium formaldehyde sulfoxilate and t-butyl hydroperoxide are added after the main body of monomers have been polymerized in order that traces of free monomer are reacted.

(b) Hydroxylated Polyester. A high hydroxyl content polyester was prepared from the following:

| | |
|---|---|
| trimethylol propane | 1206 grams |
| adipic acid | 1314 grams |
| pentaerythritol | 1224 grams |

Trimethylol propane was heated under nitrogen to 70° C. and adipic acid was then added. After these components melted (at about 120° C.) pentaerythritol was added. Heating was continued to 230° C. where the reaction was held for 3 hours. Water vapor was collected in a condenser and removed from a trap as it formed.

(c) Clear Coating Composition. The foregoing latex (a) can be utilized to produce a useful clear coating composition which can be applied to a substrate and cured at low temperatures such as 1 minute at 200° F., or an oven bake and/or infrared heat to achieve a substrate surface temperature of from about 130° F. to about 260° F. A typical clear coating composition is as follows.

| | |
|---|---|
| tetramethylol glycoluril | 720 grams |
| hydroxylated polyester (b) | 480 grams |
| Water | 997 grams |

-continued

| Latex (a) | 2440 grams |
|---|---|

Glycoluril and hydroxylated polyester were added to the latex and stirred at 80° C. The mixture was cooled after 1 hour of mixing. Defoamers, waxes, and slip aids can be added as desired. About 10% by weight (based on total solids) p-toluene sulfonic acid was added prior to use and the film was cured for 1 minute at 180° F. to provide a film with good physical properties.

EXAMPLE 2

A paint composition was prepared as follows.
(a) Similar to Example 1, an emulsion polymer was produced from the following components.

|  | Grams |
|---|---|
| Demineralized Water | 100 |
| Monawet MM-80 | 0.500 |
| Methacrylic acid | 1.0 |
| Styrene | 98.0 |
| Acrylamide | 1.0 |
| Monawet MT-70 | 0.319 |
| Hydrosulfite AWC-Rice | 0.018 |
| t-Butyl Hydroperoxide | 0.012 |
| Nuosept 95 | 0.042 |
| Ammonium Persulfate | 0.273 |

The foregoing emulsion polymer was combined with glycoluril and hydroxylated polyester of Example 1.
(b) Pigment dispersion:

| 100 g | H₂O |
|---|---|
| 4 g | Triton X 100 |
| 9 g | Aerosol 225 |
| 0.1 g | defoamer |
| 100 g | TiO₂ |
| 100 g | Silica |
| 0.1 g | Surfynol 104E |

Place water in a dispersator and add other ingredients in the order listed.

(c) Pigmented Paint. Combine 30 g latex/polyester/glycoluril blend from (a) with 15 g pigment dispersion from (b) and 3 g 40% p-toluenesulfonic acid. Cure a 1 mill film of this paint over a coated paper or wood substrate for 1 minute at 180° F.

EXAMPLE 3

Suitable hydroxylated polyesters useful in this invention are as follows where the mole ratios are shown in parentheses.

|  | moles, Dicarboxylic Acid | moles, Diol, and/or polyol |
|---|---|---|
| A. | Adipic (1) | PE (1), TMP (1) |
| B. | Azelaic (1) | PE (1), TMP (1) |
| C. | Isophthalic (1) | PE (1), TMP (1) |
| D. | Adipic (2) | PE (2), TMP (1) |
| E. | Adipic (1) | NPG (1.3) |
| F. | Adipic (1) | DEG (1.3) |
| G. | Adipic (1) | PE (2), TMP (1) |
| H. | Adipic (1) | TME (1), TMP (1) |
| I. | Adipic (2) | DEG (1), PE (3) |

PE = pentaerythritol
TMP = trimethylol propane
NPG = neopentyl glycol
DEG = diethylene glycol
TME = trimethylol ethane

EXAMPLE 4

A composition in accordance with this invention was produced from the following blend:
227 g latex from Example 1
69 g Polyester (A) above
127 g Tetramethylolglycoluril (45%)
Heat to 80° C., mix and hold 1 hour. Catalyze with 10% p-toluenesulfonic acid (wt.%). Draw down on sealed hardwood on cure at 200° F.

| Properties | Above Blend | Identical Blend (but TMP in place of polyester) |
|---|---|---|
| Gloss (60°) | 95 | 83 |
| MEK Rubs | 100 | 25 |
| Block Resistance | Excellent | Fair |
| Hold Out on uncoated paper | Good | Poor |
| Adhesion | Good–Excellent | Fair |

EXAMPLE 5

A coating for phosphate treated steel was prepared from the following:

| 10 g | latex (a), Example 1 |
|---|---|
| 3 g | polyester (I), Example 3 |
| 2.7 g | 75% tetromethylol glycoluril |
| 4.3 g | water |
| 0.1 g | naphthalenesulfonic acid |
| 0.1 g | benzoic acid |

Blend the above at 80° C. for one hour. Make a 1 mill coating on a steel test panel and bake at 125° C. for 15 minutes. The coating was glossy and hard, with good solvent resistance.

We claim:

1. A surface coating composition containing a polymeric binder, the binder comprising on a weight basis: between about 2% and 50% hydroxylated polyester containing two or more hydroxyl groups per molecule and having a molecular between 200 and 1,000, and between 0% and 90% emulsion polymer, said emulsion polymer being emulsion copolymerized ethylenic monomers, and about 2 to 50% glycoluril, said binder composition being heat curable and thermosetting to form a cured coating film.

2. The coating composition in claim 1 wherein the emulsion polymer contains reactive functional monomer selected from acrylamide, carboxyl, or hydroxyl containing monomer.

3. The coating composition in claim 1 wherein the emulsion polymer contains at least 2% by weight compolymerized functional monomers comprising 1% to 10% acrylamide or methacrylamide monomer, 0.5% to 10% carboxyic monomer, and 0% to 10% alkylhydroxy monomer.

4. The composition in claim 1 wherein the hydroxylated polyester contains three or more hydroxyl groups per molecule.

5. The composition in claim 1 wherein the composition comprises on a weight basis between 20% and 50% hydroxylated polyester, between 5% and 20% glycoluril, and between 30% and 50% emulsion polymer.

6. The composition in claim 1 wherein the composition contains pigment to produce a pigmented coating.

* * * * *